United States Patent
Chou

(10) Patent No.: US 8,203,659 B2
(45) Date of Patent: Jun. 19, 2012

(54) LCD DISPLAY AND GAMING MACHINE COMBINATION

(75) Inventor: Kun-Liang Chou, Taipei (TW)

(73) Assignee: Litemax Electronics Inc., New Taipei (TW)

(*) Notice: Subject to any disclaimer, the term of this patent is extended or adjusted under 35 U.S.C. 154(b) by 172 days.

(21) Appl. No.: 12/855,704

(22) Filed: Aug. 13, 2010

(65) Prior Publication Data

US 2012/0038837 A1  Feb. 16, 2012

(51) Int. Cl.
- *G02F 1/1335* (2006.01)
- *G02F 1/13357* (2006.01)
- *G02F 1/13* (2006.01)
- *A63F 13/00* (2006.01)
- *A63F 13/06* (2006.01)

(52) U.S. Cl. .................. 349/1; 349/11; 349/12; 349/16; 349/17; 463/16; 463/31; 463/34; 463/37

(58) Field of Classification Search ........................ None
See application file for complete search history.

(56) References Cited

U.S. PATENT DOCUMENTS

| | | | |
|---|---|---|---|
| 7,307,675 B2* | 12/2007 | Abileah | 349/61 |
| 7,355,660 B2* | 4/2008 | Ikeda | 349/60 |
| 7,510,476 B2* | 3/2009 | Kobayashi | 463/31 |
| 8,123,609 B2* | 2/2012 | Sekiguchi et al. | 463/20 |
| 2004/0209681 A1* | 10/2004 | Emori et al. | 463/31 |
| 2005/0085292 A1* | 4/2005 | Inamura | 463/25 |
| 2005/0153775 A1* | 7/2005 | Griswold et al. | 463/30 |
| 2011/0312403 A1* | 12/2011 | Fujimoto et al. | 463/20 |

* cited by examiner

*Primary Examiner* — Michelle R Connelly

(57) ABSTRACT

A combination of an LCD display and a gaming machine includes an LCD comprising a touchscreen, a liquid crystal panel, a backlight module, printed circuit boards, and a rear cover having an opening wherein the backlight module comprises, from front to rear, four optical films each having three openings, three barrier films, a light guide having three openings, two light sources on top and bottom edges of the light guide respectively, a reflecting film having three openings, and a frame plate having three openings, the barrier films functions as a visual barrier or a transparent member by adjusting voltage applied thereto, and the openings are aligned one another; a plurality of revolving wheels disposed behind the LCD, each wheel comprising a plurality of symbols arranged annually thereon. One pattern including the symbols of the wheels behind the openings is illuminated by the light source.

1 Claim, 12 Drawing Sheets

LCD DISPLAY AND GAMING MACHINE COMBINATION

BACKGROUND OF THE INVENTION

1. Field of Invention

The invention relates to liquid crystal display (LCD) devices and more particularly to a backlit LCD display and gaming machine combination.

2. Description of Related Art

LCD is a thin, flat electronic visual display that uses the light modulating properties of liquid crystals (LCs). LCs do not emit light directly. They are used in a wide range of applications including computer monitors, television, instrument panels, etc. They are common in consumer devices such as video players, gaming devices, clocks, watches, calculators, and telephones. LCDs have displaced cathode ray tube (CRT) displays in most applications. They are usually more compact, lightweight, portable, less expensive, more reliable, and easier on the eyes.

However, the conventional LCD displays are for display purposes only. Thus, the need for improvement still exists.

SUMMARY OF THE INVENTION

It is therefore one object of the invention to provide a combination of an LCD (liquid crystal display) display and a gaming machine, comprising an LCD comprising a touchscreen, a liquid crystal panel, a backlight module, a plurality of printed circuit boards (PCBs), and a rear cover having an opening wherein the backlight module comprises, from front to rear, four optical films each having three openings, three barrier films, a light guide having three openings, two light sources on top and bottom edges of the light guide respectively, a reflecting film having three openings, and a frame plate having three openings, the barrier films functions as a visual barrier or a transparent member by adjusting voltage applied thereto, and the openings are aligned one another; and a plurality of revolving wheels disposed behind the LCD, each wheel comprising a plurality of symbols arranged annually thereon, wherein one pattern including the symbols of the wheels behind the openings is illuminated by the light sources; and wherein in response to activating the wheels and deactivating same after a predetermined period of time, in a first operation the barrier films are activated to inhibit one pattern of symbols behind the openings from being visible on front of the LCD, and in a second operation the barrier films are activated to allow one pattern of symbols behind the openings to be visible on front of the LCD.

The above and other objects, features and advantages of the invention will become apparent from the following detailed description taken with the accompanying drawings.

DETAILED DESCRIPTION OF THE INVENTION

Figure 1:
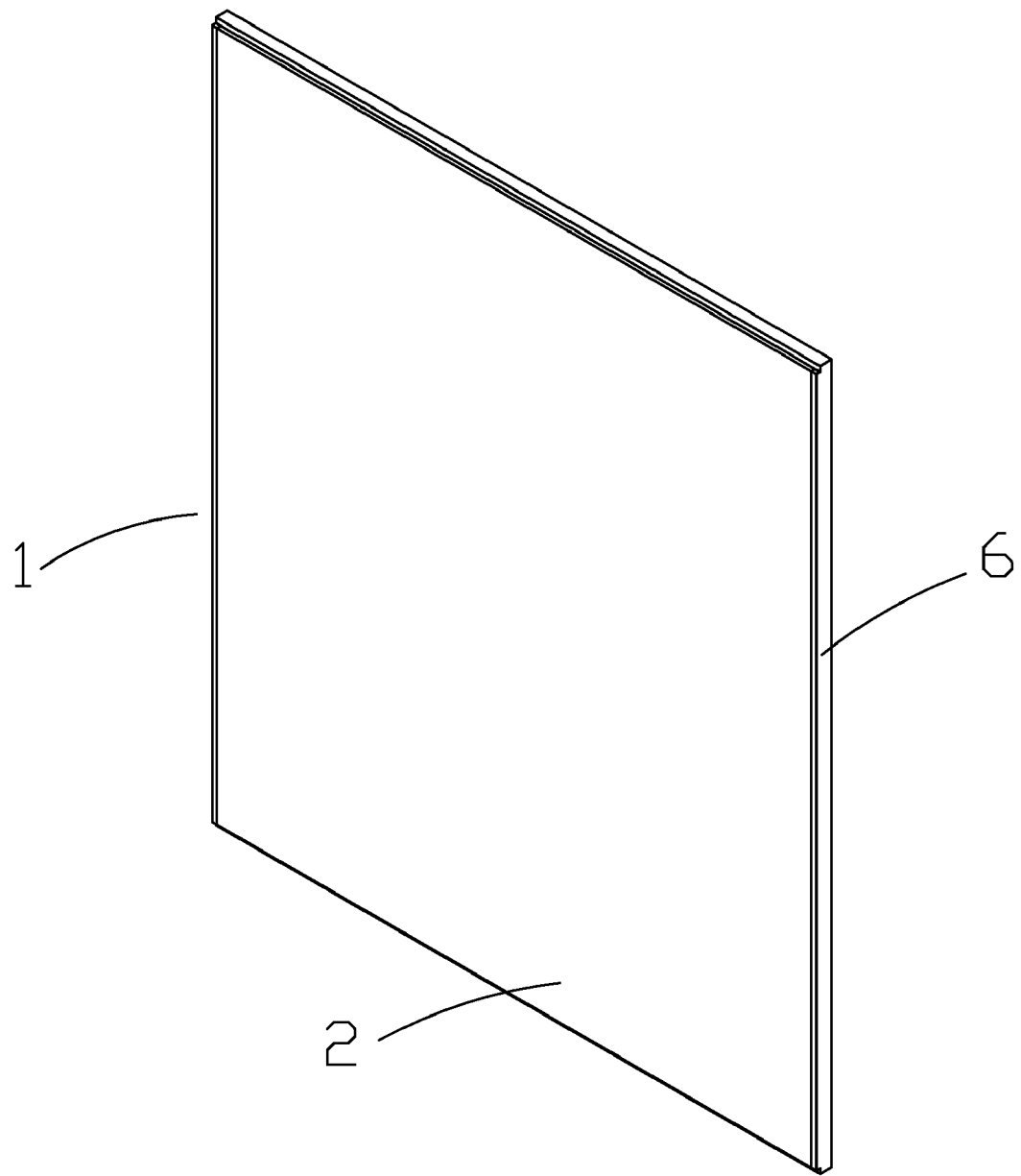
FIG. 1 is a perspective view of an LCD display according to the invention.
Figure 2:
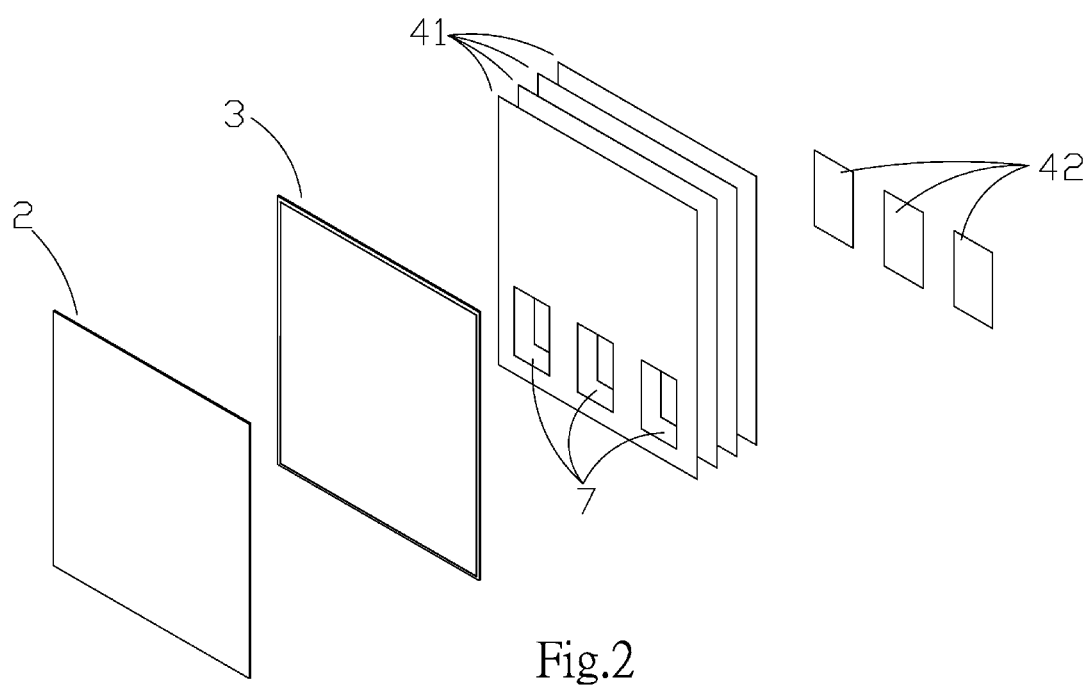
FIGS. 2 and 3 are exploded views of the LCD display.
Figure 3:
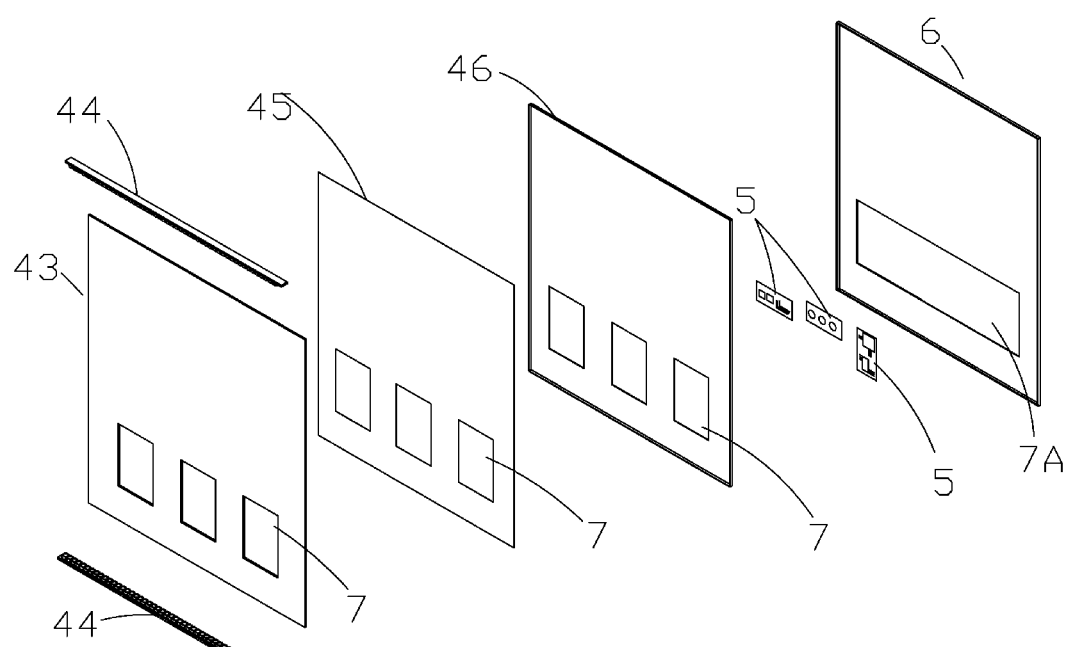
Figure 4:
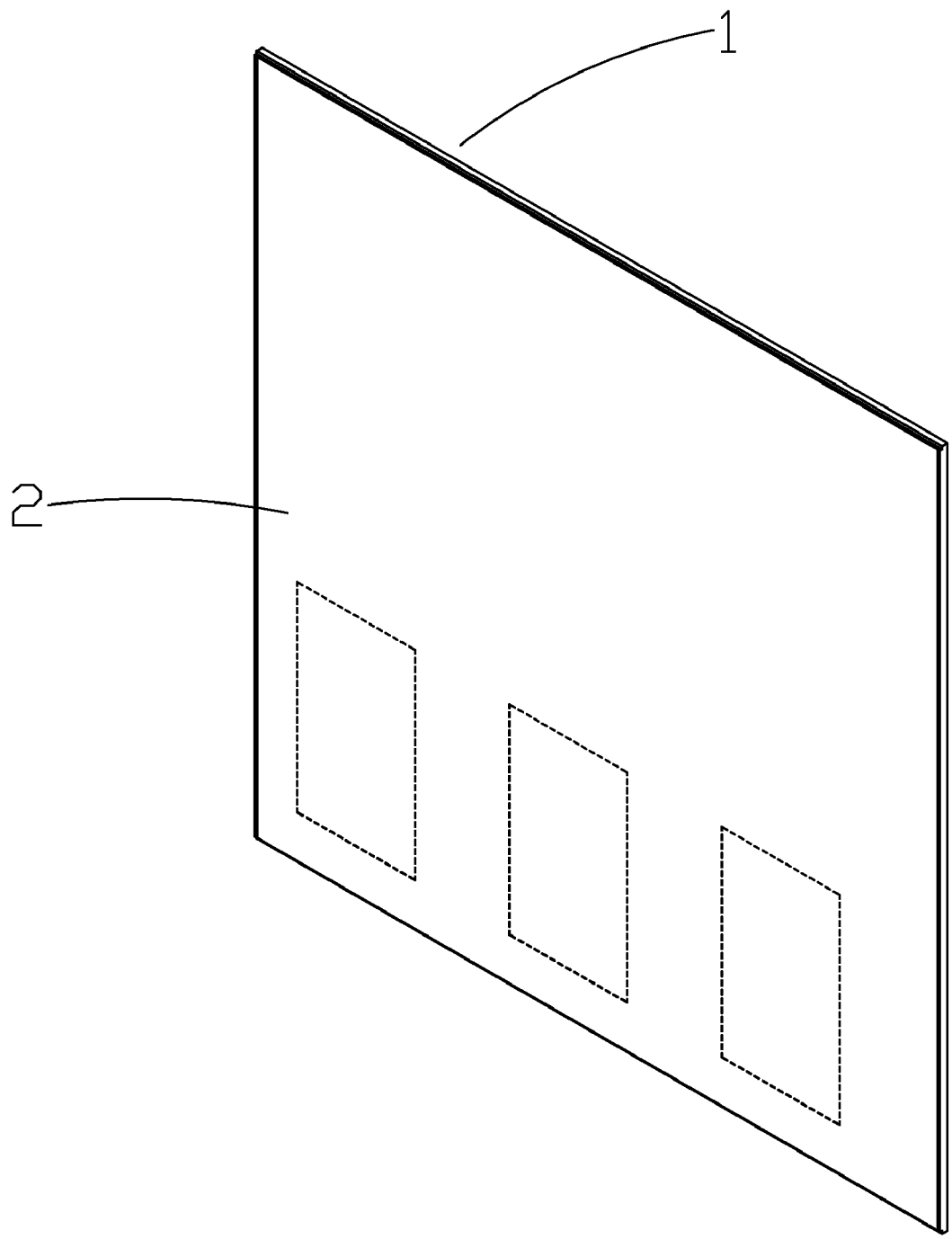
FIG. 4 is a schematic view of the LCD display in FIG. 1.
Figure 5:
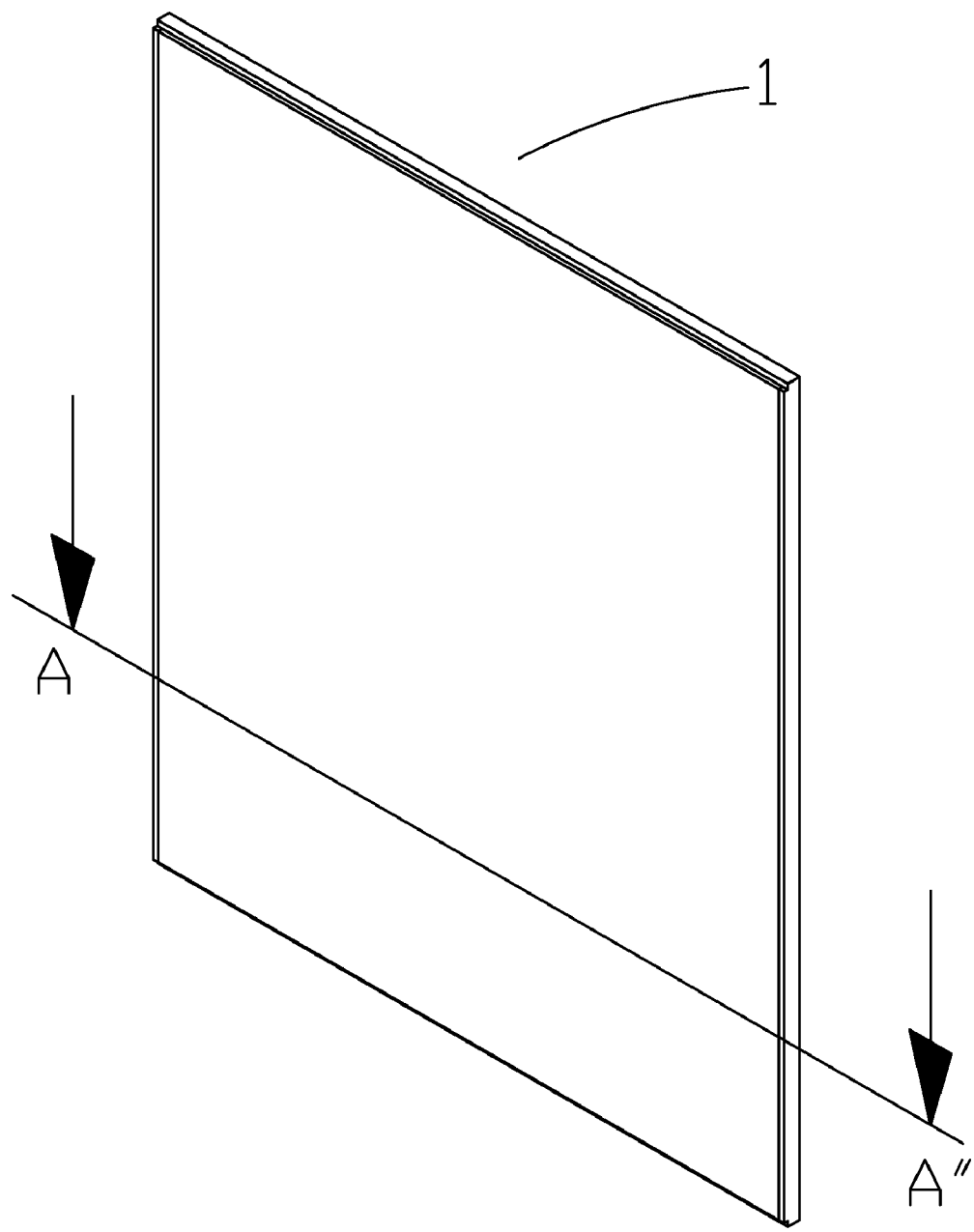
FIG. 5 is a view similar to FIG. 1 showing a sectional view to be taken.
Figure 6:
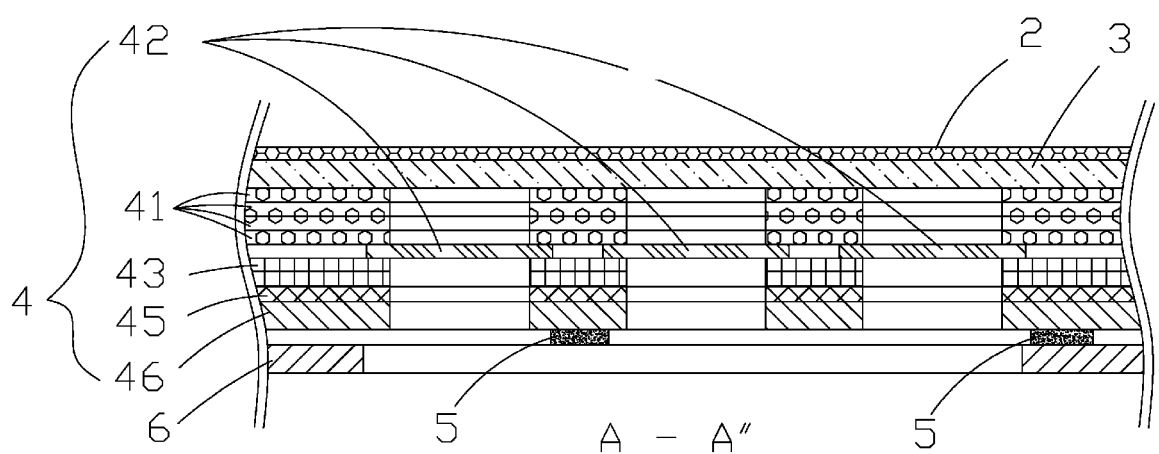
FIGS. 6 and 7 are sectional views taken along line A-A" of FIG. 5.
Figure 7:
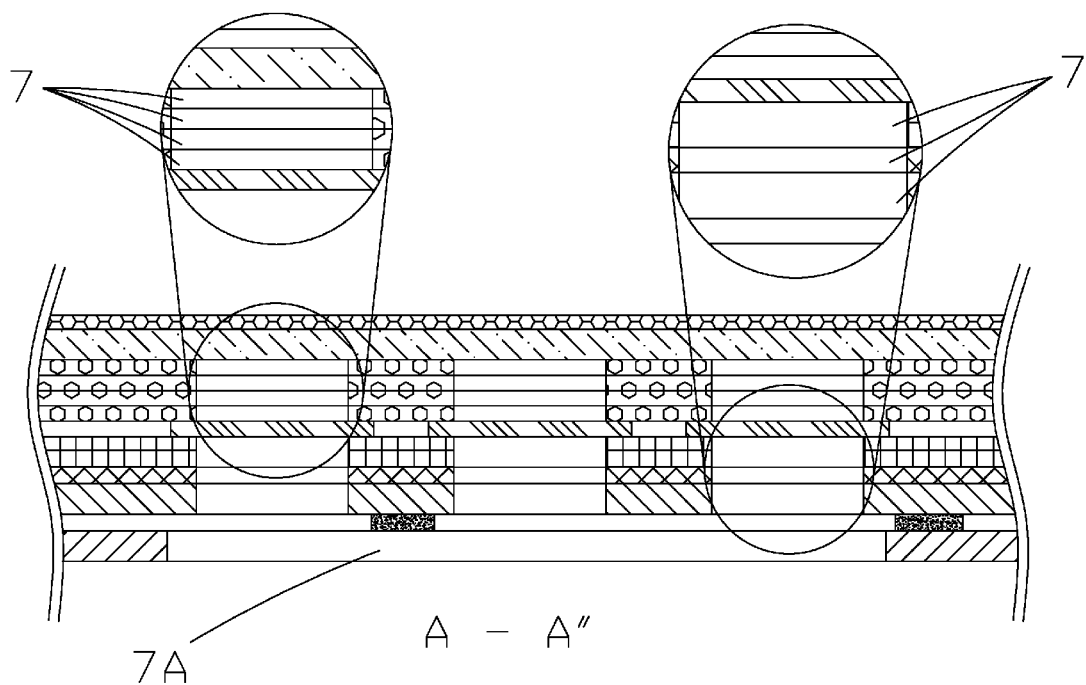
Figure 8:
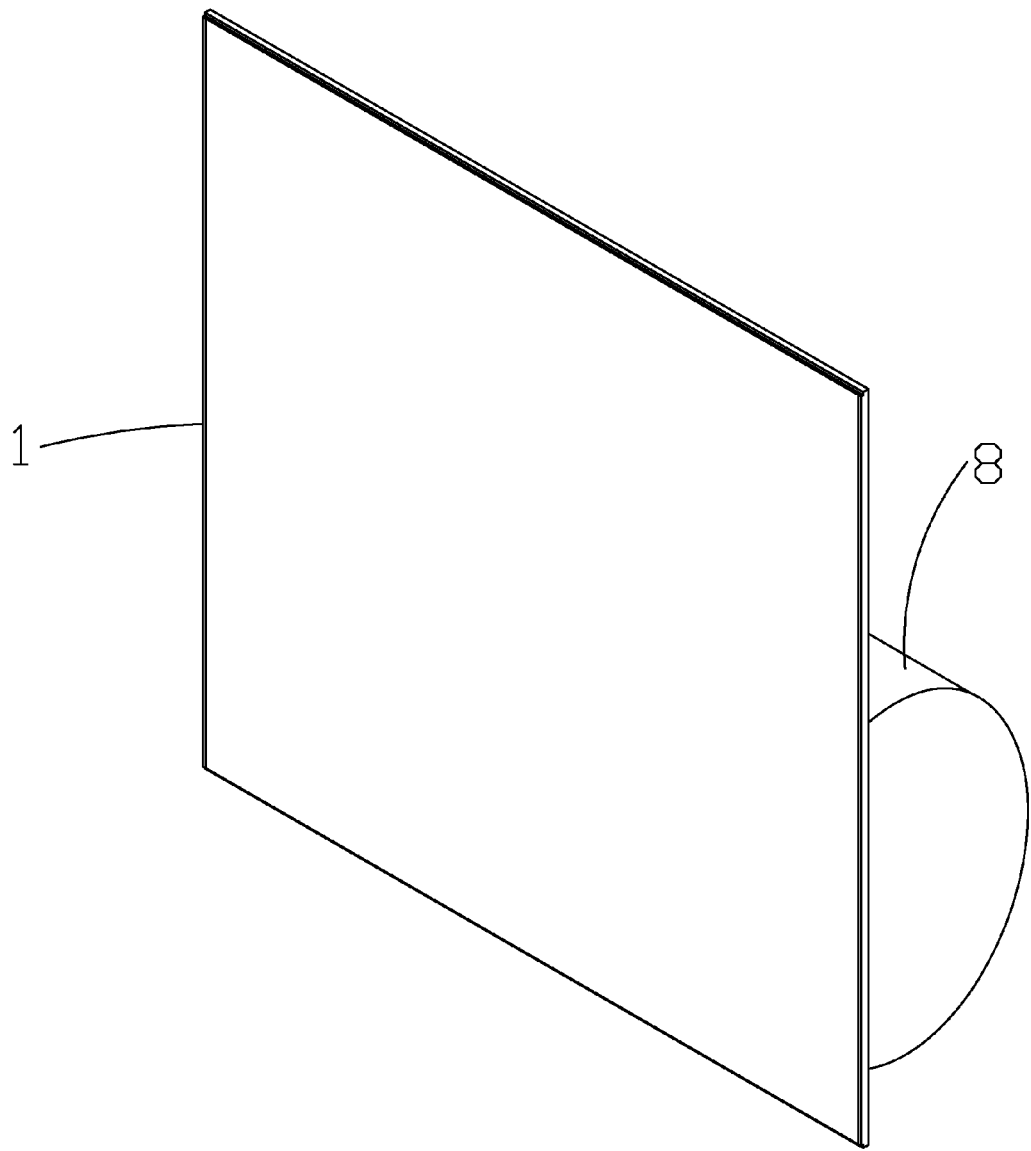
FIG. 8 is a combination of the LCD display and a gaming machine according to the invention.
Figure 9:
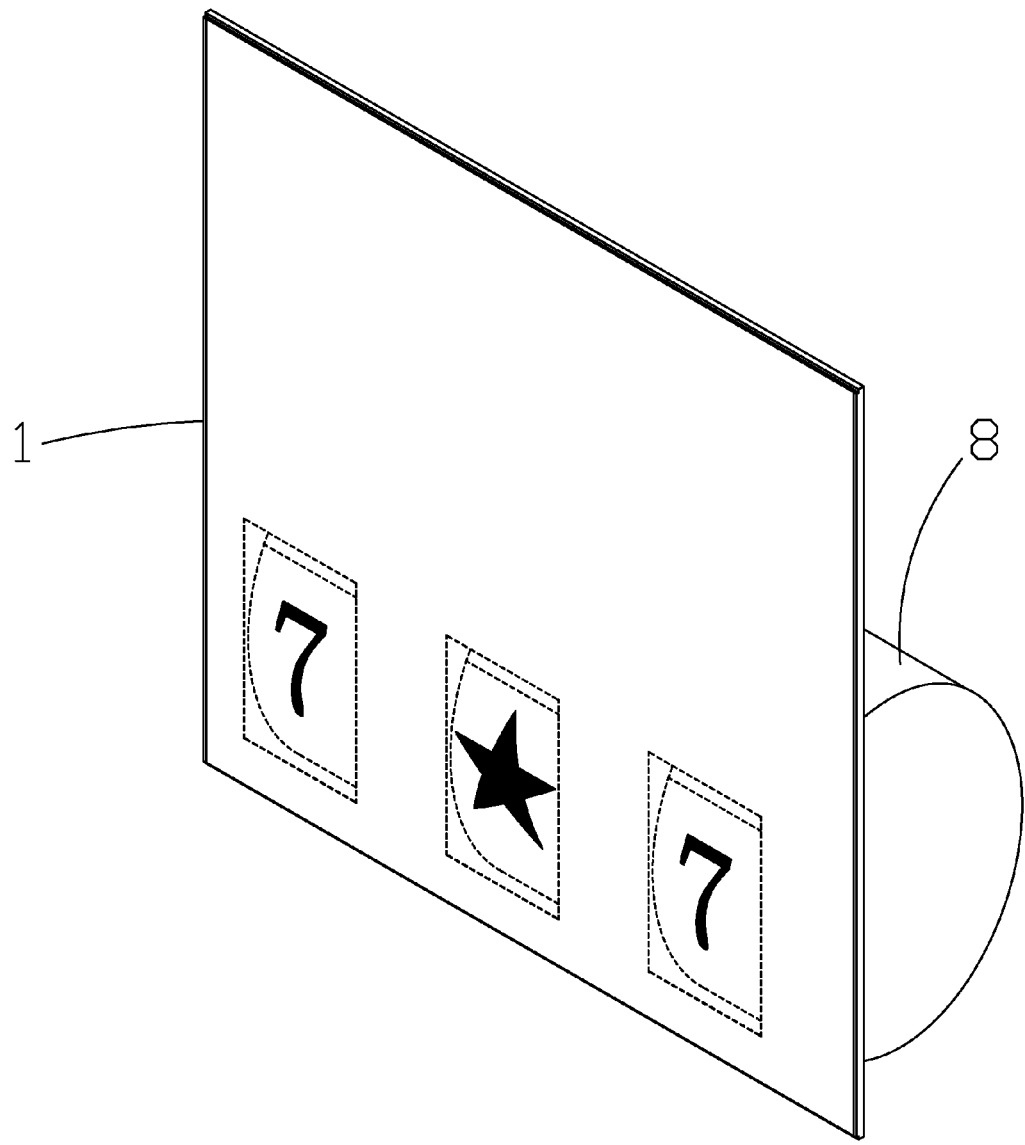
FIG. 9 is a schematic view of the LCD display and the gaming machine.
Figure 10:
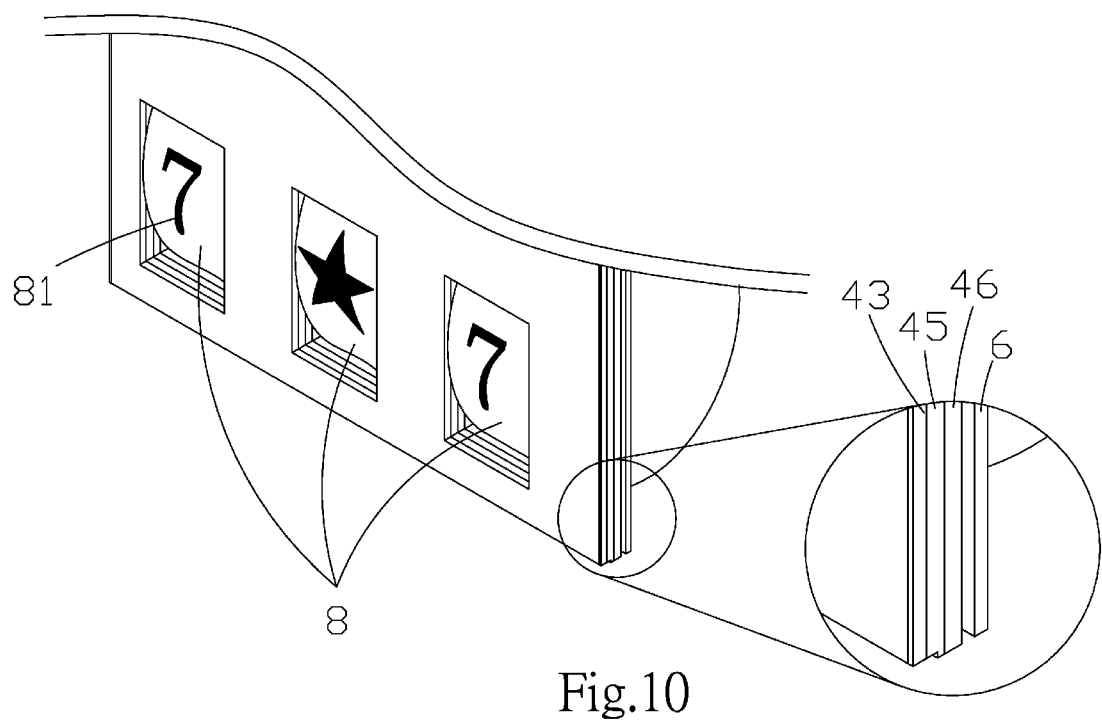
FIG. 10 is a detailed view of the lower portion of FIG. 9.
Figure 11:
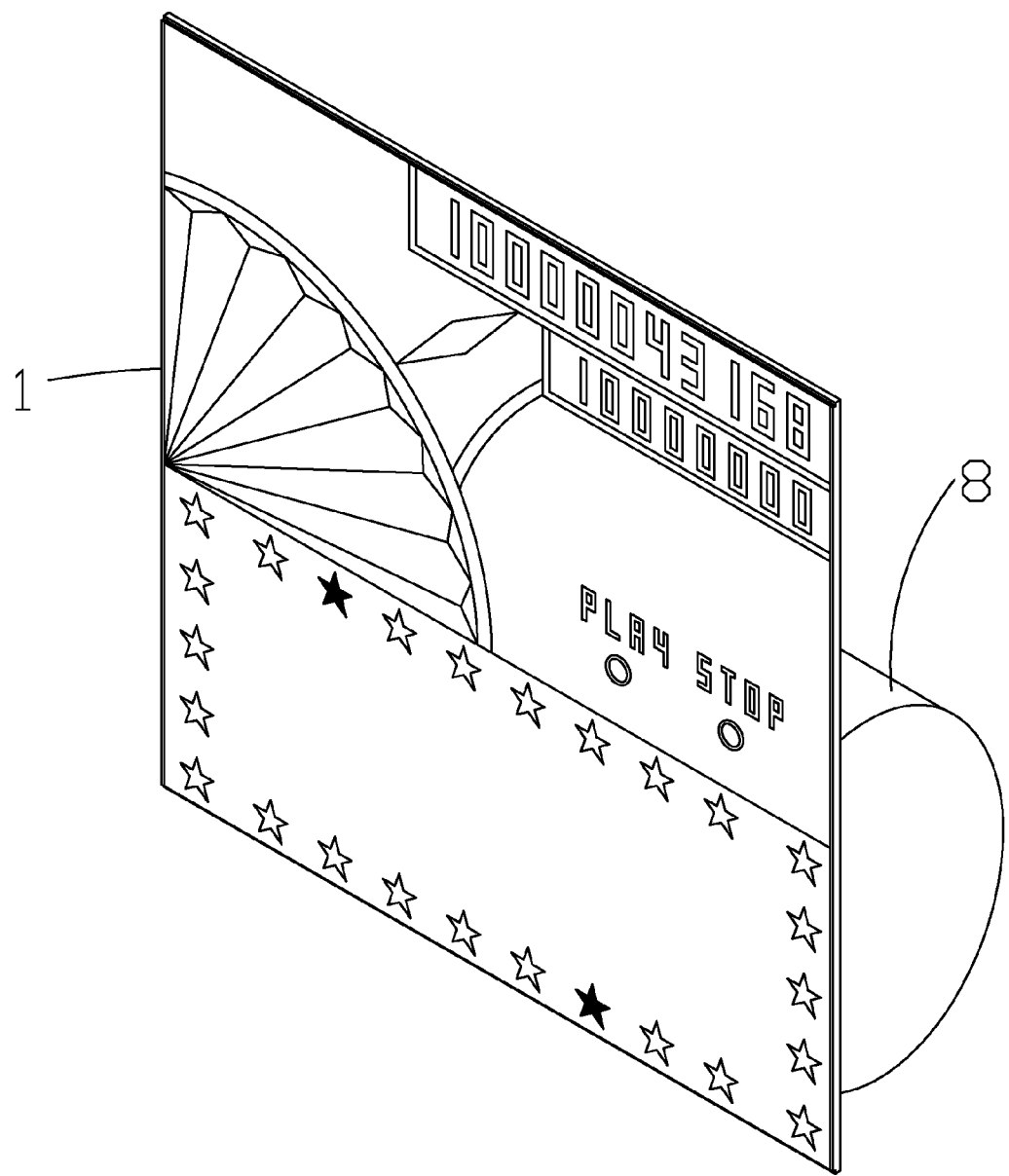
FIGS. 11 and 12 are perspective views of the LCD display and the gaming machine in operation.
Figure 12:
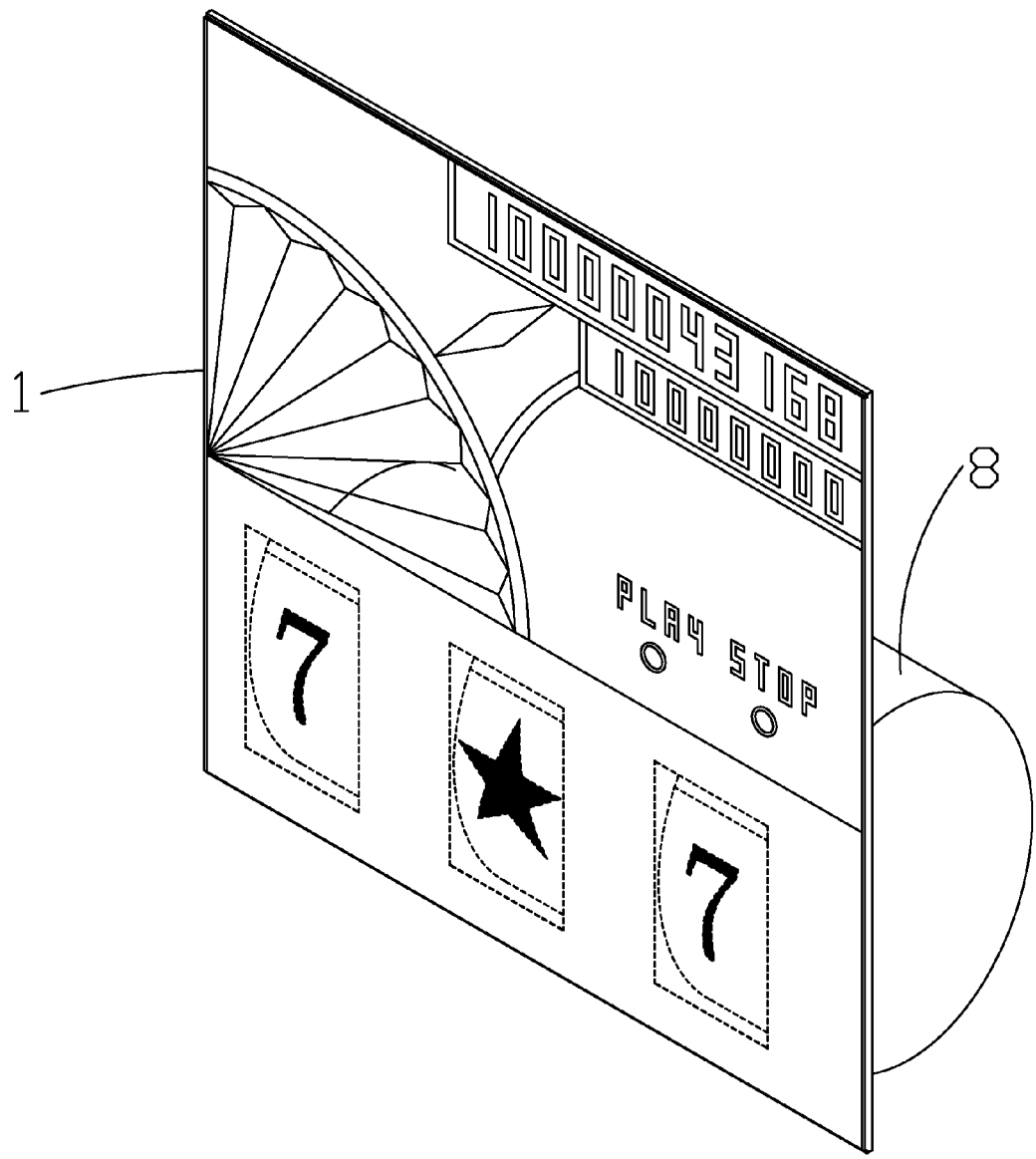

Referring to FIGS. 1 to 12, an LCD display 1 and gaming machine 8 combination in accordance with the invention is shown. The LCD display 1 comprises, from front to rear, a rectangular touchscreen 2, a rectangular liquid crystal (LC) panel 3, a backlight module 4, a plurality of printed circuit boards (PCBs) 5, and a rectangular rear cover 6 having a rectangular lower opening 7A.

The backlight module 4 comprises, from front to rear, four optical films 41 each having three rectangular openings 7 on a lower portion, three rectangular barrier films 42, a rectangular light guide 43 having three rectangular openings 7 on a lower portion, two elongated light sources 44 on top and bottom edges of the light guide 43 respectively, a reflecting film 45 having three rectangular openings 7 on a lower portion, and a rectangular frame plate 46 having three rectangular openings 7 on a lower portion.

The barrier films 42 are disposed behind and aligned with the openings 7 of the optical films 41. In an alternative embodiment, the barrier films 42 are disposed in front of and aligned with the openings 7 of the optical films 41. The barrier films 42 functions as a visual blocking means or a transparent means by adjusting voltage applied thereto. These openings 7, 7A are aligned one another in a front to rear direction (see FIGS. 6 and 7). The light sources 44 are light-emitting diodes (LEDs). The light guide 43 may direct light emitted by the light sources 44 to the LC panel 3. The reflecting film 45 may reflect rearward light emitted by the light sources 44 toward the front. The optical films 41 may increase brightness and uniformity of light projecting onto the LC panel 3.

Three parallel aligned revolving wheels 8, functioning as a typical slot machine, are mounted behind the LCD display 1. A plurality of symbols 81 are arranged annually on the circumferential surface of the wheel 8 in which one pattern of symbol 81 behind the opening 7A is illuminated by the light sources 44. The operation of the wheel 8 can be controlled by pressing "play" or "stop" buttons on the LCD display 1 (see FIG. 11). In one instance by pressing the "play" button first and pressing the "stop" button later, the barrier films 42 are activated to inhibit the pattern of symbols 81 behind the openings 7, 7A from being seen on front of the LCD display 1. In another instance by pressing the "play" button first and pressing the "stop" button later, the barrier films 42 are activated to allow the pattern of symbols 81 behind in the openings 7, 7A to be seen on front of the LCD display 1 when the wheels 8 stop spinning (e.g., "7*7" of FIG. 9). Moreover, scores can be shown on top of the LCD display 1 (see FIG. 11). Further, colorful, attractive images can be shown on the LCD display 1 so as to be more interesting (see FIG. 11).

While the invention has been described in terms of preferred embodiments, those skilled in the art will recognize that the invention can be practiced with modifications within the spirit and scope of the appended claims.

What is claimed is:

1. A combination of an LCD (liquid crystal display) display and a gaming machine, comprising:

an LCD (1) comprising a touchscreen (2), a liquid crystal (LC) panel (3), a backlight module (4), a plurality of printed circuit boards (PCBs) (5), and a rear cover (6) having an opening (7A) wherein the backlight module (4) comprises, from front to rear, four optical films (41)

each having three openings (7), three barrier films (42), a light guide (43) having three openings (7), two light sources (44) on top and bottom edges of the light guide (43) respectively, a reflecting film (45) having three openings (7), and a frame plate (46) having three openings (7), the barrier films (42) functions as a visual barrier or a transparent member by adjusting voltage applied thereto, and the openings (7, 7A) are aligned one another; and a plurality of revolving wheels (8) disposed behind the LCD (1), each wheel (8) comprising a plurality of symbols (81) arranged annually thereon, wherein one pattern including the symbols (81) of the wheels (8) behind the openings (7, 7A) is illuminated by the light sources (44); and wherein in response to activating the wheels (8) and deactivating same after a predetermined period of time, in a first operation the barrier films (42) are activated to inhibit one pattern of symbols (81) behind the openings (7, 7A) from being visible on front of the LCD (1), and in a second operation the barrier films (42) are activated to allow one pattern of symbols (81) behind the openings (7, 7A) to be visible on front of the LCD (1).

* * * * *